United States Patent [19]
Shockey et al.

[11] 3,793,874
[45] Feb. 26, 1974

[54] METHOD FOR DETERMINING FRACTURE TOUGHNESS USING SMALL SPECIMENS

[75] Inventors: Donald A. Shockey, Menlo Park; Donald R. Curran, Palo Alto, both of Calif.

[73] Assignee: Stanford Research Institute, Menlo Park, Calif.

[22] Filed: Aug. 25, 1972

[21] Appl. No.: 283,785

[52] U.S. Cl. ................................................ 73/12
[51] Int. Cl. ............................................ G01n 3/30
[58] Field of Search ..................................... 73/12

[56]  References Cited
OTHER PUBLICATIONS

J. M. Barsom, and S. T. Rolfe, Correlations Between $K_{Ic}$ and Charpy V-Notch Test Results In The Transition Temp. Range, A.S.T.M.-STP P. 466, 281–302.
A. J. Bush, Dynamic Fracture Toughness Tests on A302-B Steel, A.S.T.M.-STP P. 466, 259–280.

*Primary Examiner*—Donald O. Woodiel
*Assistant Examiner*—Anthony V. Ciarlante
*Attorney, Agent, or Firm*—Flehr, Hohbach, Test, Albritton & Herbert

[57] ABSTRACT

A method for determining the plane strain fracture toughness $K_{Ic}$ of a material. A specimen of a material is impacted with a gas gun to produce flat plate impact and hence uniaxial strain. The specimen is recovered, sectioned and the size distribution of internal cracks determined. The specimen is then impacted again, sectioned, and the new crack size distribution determined. The old and new crack distributions are then compared to determine $a_c$, the critical crack half length of radius above which cracks grew and below which they did not. Knowing the tensile stress caused by the second impact and the critical crack half length, the fracture toughness is then calculated from the appropriate fracture mechanics expression.

9 Claims, 10 Drawing Figures

XZ PLANE IS PLANE OF POLISH.
a-b IS APPARENT CRACK LENGTH ≡ 2c
ANGLE α IS APPARENT CRACK ORIENTATION

ASSUMPTIONS:
- CIRCULAR CRACKS
- ALL $\theta_s$ EQUALLY PROBABLE

FIG. 4

REGION OF INTEGRATION IN α-φ PLANE

FIG. 5

INTEGRATION REGION IN U-φ PLANE

FIG. 6

A TYPICAL SEGMENT OF THE REGION OF INTEGRATION IN THE U-φ PLANE

METHOD FOR DETERMINING FRACTURE TOUGHNESS USING SMALL SPECIMENS

BACKGROUND OF THE INVENTION

This invention pertains to a method for measuring the plane strain fracture toughness of a material and more particularly pertains to such a method utilizing small specimens which are dynamically loaded.

It is important to design engineers to know the plane strain fracture toughness of materials utilized in construction of various devices. The plane strain fracture toughness $K_{Ic}$ characterizes the resistance of material to the onset of rapid fracture. For example, in building a pressure vessel it is impossible to get rid of all cracks in the material from which the vessel is formed, so it is important for design engineers to know how big a crack can be and still be left in the material. The fracture mechanics approach to characterizing the fracture toughness of material has proven very useful in the solution of engineering design problems. One of the results of the success of fracture mechanics is that users now generally require alloy manufacturers to supply values of the plane strain fracture toughness $K_{Ic}$ of their product.

In order to determine the plane strain fracture toughness of a material it is necessary to have plane strain conditions. This means that a crack has to be propagated in material which is elastically constrained around the crack. The only way to do this is to have a large specimen so that there can be a lot of material around the crack which does not get into the plastic region but rather stays elastic so that plastic flow does not occur at the tip of the crack.

Determination of $K_{Ic}$ for high strength alloys is easily carried out in the laboratory with relatively little expenditure of time and money for some alloys. The typical prior art method of determining this is to quasi-statically load a sample while observing a particular crack in the sample, and increase the loading until the crack is propagated. Utilizing this method with some of the tougher alloys, however, presents serious difficulties. In order to insure plane strain conditions there are minimum specimen or sample size requirements, which increase rapidly with increasing toughness and decreasing yield strength. Thus, for some tough alloys, specimens may be required which are so large that production becomes problematic, and conventional tensile machines no longer have the force capacity to fracture them.

What is needed, therefore, is a method for determining the plane strain fracture toughness of a material utilizing small laboratory size specimens. Such a method would be of special use in reactor technology, for example, where it is informative to determine the fracture toughness of an irradiated material. That is, if you have a pressure vessel receiving radiation, it is useful to know the fracture toughness of the material after being irradiated for some time. This is a big factor in the safety of the reactor so that if this type of test can only be done on big specimens it is impossible to use with a reactor because such big specimens cannot be put inside the reactor. Small specimens on the other hand can be put inside the reactor and irradiated at the same rate that the walls of the pressure vessel are being irradiated.

SUMMARY OF THE INVENTION

It is therefore an object of this invention to provide a method for determining the fracture toughness of materials utilizing small specimens.

It is another object of this invention to provide a method for determining the fracture toughness of material utilizing small specimens which are dynamically loaded.

It is another object of this invention to provide a method for determining the fracture toughness of material utilizing small dynamically loaded specimens in which the critical radius for crack propagation is determined utilizing a statistical approach.

Briefly, in accordance with one embodiment of the invention, the plane strain fracture toughness coefficient $K_{Ic}$ of a material is determined by loading a specimen of the material to produce uniaxial strain and hence triaxial stress which causes internal cracks in the specimen. The size distribution of the internal cracks is determined. The specimen is then loaded again with a known stress and the new crack size distribution determined. The critical crack half length $a_c$ above which cracks grew and below which they did not, is thus determined from which the fracture toughness coefficient $K_{Ic}$ can be calculated.

DESCRIPTION OF THE PREFERRED EMBODIMENTS

Figure 1:
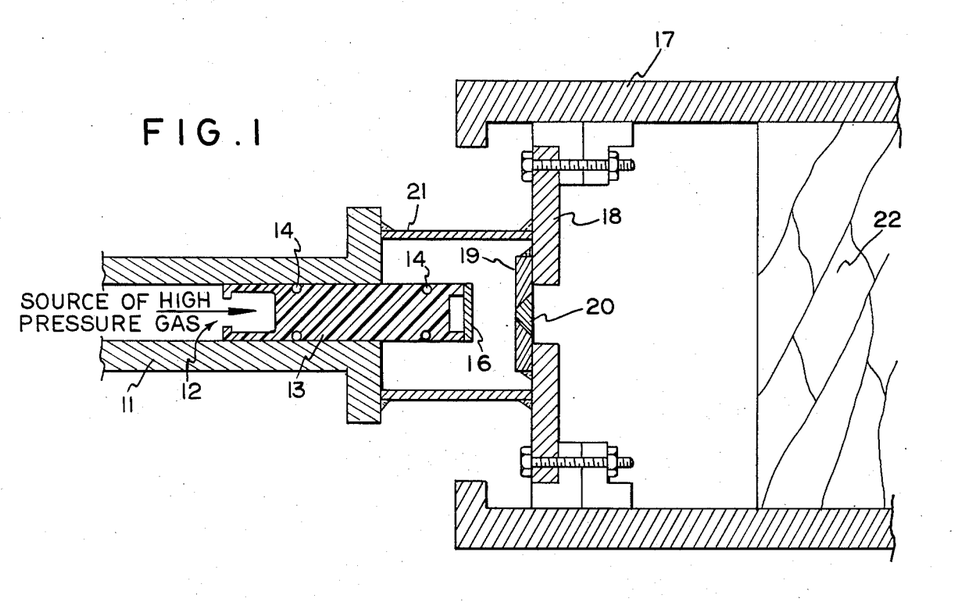
FIG. 1 is a schematic diagram of a gas gun apparatus utilized to produce an internal crack distribution in specimens.

The method of this invention uses a gas gun to produce high strain rates and hence triaxial stress states in small properly designed specimens. Referring to FIG. 1 there is shown in schematic form a gas gun suitable for use in the method of this invention. A gas gun barrel 11 has an aperture 12 adapted to be coupled to a source of high pressure gas. A projectile 13 is disposed within the aperture 12 and has suitable means such as O rings 14 for sealing the projectile within the aperture. The projectile 13 has a projectile plate 16 disposed on one end thereof. A catcher box 17 is provided having means such as a steel plate 18 for mounting a target plate 19. The target plate 19 contains a tapered target of the specimen 20 of the material being investigated. A vacuum seal 21 is provided between the gas gun barrel 11 and the steel plate 18 so that a vacuum is maintained between the projectile 16 and the target specimen 20. Suitable energy absorbing material 22 may be provided in the catcher box 17 for catching the tapered target specimen 20 after impact of the projectile plate 16, which dislodges the tapered target specimen 20 from the target plate 19. In operation, when the source of high pressure gas is coupled to the aperture 12 in the gas gun barrel 11, the projectile 13 is displaced to the right in FIG. 1 causing the projectile plate 16 to impact the target plate 19 and hence the tapered target specimen 20 disposed therein.

Figure 2:
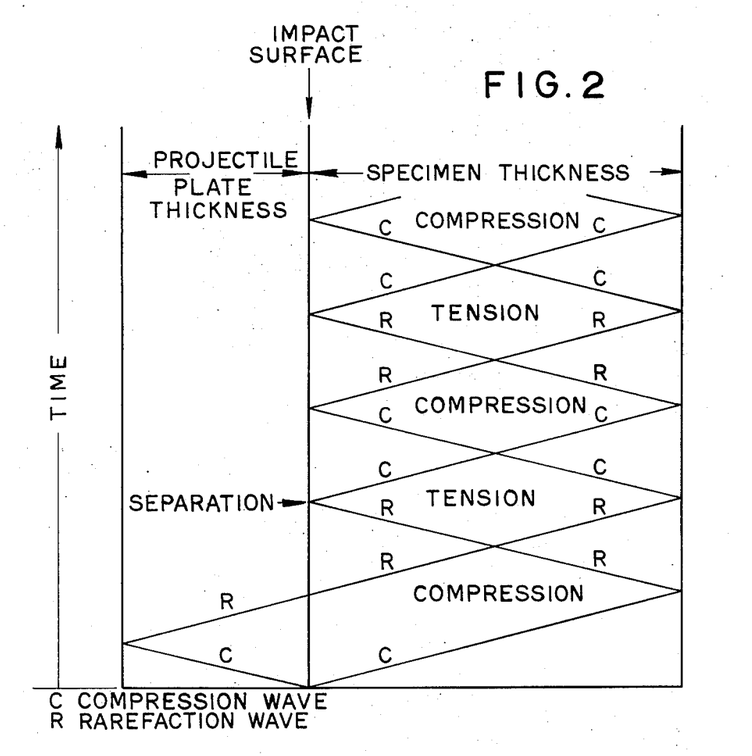
FIG. 2 is a schematic representation of the loading history of a specimen as it is impacted showing progress of tension and compression waves as a function of time.

The loading history of the tapered target specimen and the projectile plate is depicted schematically in FIG. 2 which shows a cross-sectional view of this projectile plate and specimen and the progress of the waves therein as a function of time. For example, a short cylinder of specimen material say 1 ½ inches thick is impacted evenly across its face by a similar cylindrical plate of the same material but half the thickness. Upon flat plate impact, a one dimensional compressive strain wave runs into the specimen and the projectile plate, loading both in compression. Upon reaching the free surfaces, the compression waves reflect as rarefaction waves back into the cylinders and load the material. At the point where the rarefaction waves intersect, tension is produced, and as the waves continue running they load increasingly more of the specimen in tension.

At the specimen free surface the rarefaction wave is again reflected back into the specimen, relaxing the tensile stress as it propagates. The other rarefaction wave is reflected at the impact surface in the same way. Since this interface has no strength and therefore cannot support tension, the specimen and projectile plate begin to fly apart at this instant. When the two inward propagating waves again intersect, they begin to load the specimen in compression again, and the process repeats itself. Subsequent compression and tension phases constitute the pnenomenon of "ringing." In most materials the stresses in successive phases decrease rapidly.

Assume for example a 1-½ inches diameter by one-fourth inch thick specimen. Because of the large aspect ratio of the specimen, unloading waves from the specimen periphery will have run inward towards the central axis only a distance of about five-sixteenths inch at the completion of the first tension phase. This means that an internal cylinder of the specimen of about seven-eighths inch in diameter experiences uniaxial tensile strain, and hence triaxial tensile stress — a stress state very similar to that produced in the interior of a large plane strain specimen. In essence then, the interior of the specimen behaves as if it had infinite lateral dimensions for the duration of the first tension phase.

To measure the fracture toughness under these conditions of tri-tensile stress and high loading rate, it is necessary to have a crack in the material. Moreover, since triaxial tension exists only in the interior of the specimen, the crack must be an internal one, completely contained in the uniaxial strain region. The loading technique described above in connection with FIG. 1 produces in the material specimen the stress history depicted in FIG. 2.

There are a number of experimental techniques for measuring the stress history in the specimen, which include piezoelectric, piezoresistant and electromagnetic transducers. These are well known to those skilled in the art. In addition, the stress history can be deduced from experimental measurements of the particle velocity or the free surface velocity by optical or electric methods, in-material gauges or flash x-ray techniques. Furthermore, sophisticated wave propagation codes have been developed which can account for the effects of material inhomogenities, inelastic behavior and developing fracture damage on the stress history. These techniques are described in literature known to those skilled in the art.

Numerous internal microcracks can be produced in most materials by flat-plate impact as described above. If the stress in the tensile phase of such a gas gun impact arrangement exceeds some threshold level, numerous pre-existing defects in the specimen material are activated and begin to propagate as cracks. These cracks tend to run on planes normal to the direction of the maximum tensile stress and therefore tend to lie on planes parallel to the plane of the specimen. Cracks in polycrystalline materials or materials having anisotropic fracture properties, however, are more randomly oriented. Because of the short duration of the tensile pulse, activated cracks arrest or stop after propagating a short distance. The result is thus a specimen with no outward evidence of fracture damage but containing a large number of internal cracks.

For quantitative fracture toughness determinations it is necessary to know the number and size of the internal cracks. To do this, the impacted specimen is sectioned on a chord and the sectioned surface is polished. The traces of cracks intersecting the polished surface are counted and measured from a micro-photograph, for example. The cracks are characterized by a trace length intersection with the polished surface. Some transformation of the trace length or surface distribution is necessary to determine the volume density of cracks. For transparent materials, this presents no problem since the true crack sizes beneath the polished surface can be observed and measured through the transparent material. For opaque materials, however, some sort of transformation from trace length to true size is needed. One such technique is a Scheil-type statistical transformation which is discussed hereinafter.

In any event, the large number of internal cracks in the specimen makes a statistical approach possible. When a specimen containing a known size distribution of cracks is suddenly subjected to a stress larger than the quasi-static fracture stress, cracks larger than some critical size will be activated and grow, whereas those smaller than the critical size will remain dormant. The critical half length $a_c$ is determined by comparing the old and the new crack size distributions. This value and the value of the applied tensile strength are then used to calculate the fracture toughness by means of the appropriate fracture mechanics expression. That is, the fracture toughness is determined by relating the critical stress and the critical crack size by the appropriate expression for the particular specimen and loading geometry. For example, Sneddon's expression for an internal penny-shaped crack in an infinite medium under uniform tension is given as $$K_{Ic} = 2\sigma (a_c/\pi)^{1/2} \quad (1)$$

Photographic maps are made of the plane of polish, and the location, size and orientation of every crack is recorded. This counting and measuring operation is tedious, but can be facilitated by using a "telereadex machine" with which the operator simply places a pointer at each end and at both sides of a crack in the photograph. The machine records this information on punched cards, and a small computer program can then convert these data into the desired size, orientation, and location values. In a typical computer program the sample is divided into predetermined zones of differing average distance across the sample thickness. Thus, all the material in a zone is assumed to have undergone the same loading history, resulting in uniform damage. All zones have experienced approximately the same peak tensile stress, but the average stress duration varies from zone to zone. For each zone, the program selects the cracks which fall within previously specified intervals of crack size and crack orientation. Thus, the counter operation produces the surface distribution functions $N_s(C_i, \alpha_j, \sigma, t)$, where this function is defined as the number of cracks intercepting a unit area of the plane of polish with apparent radii between $C_i$ and $C_i + \Delta C_i$, and apparent orientation angles between $\alpha_j$ and $\alpha_j + \Delta \alpha_j$, where the peak tensile stress was $\sigma$ and the stress duration was $t$.

In summary form, the procedure for determining $K_{Ic}$ at high strain rates includes producing flat plate impact and hence uniaxial strain in the specimen. The specimen is then sectioned and the size distribution of internal cracks determined. Next, another cylindrical specimen of sufficiently high aspect ratio is prepared from the original specimen. The new specimen, which has a known size distribution of internal cracks, is again impacted at a known tensile stress. The new specimen is then sectioned and the new crack size distribution determined. By comparing the old and new crack size distrubutions the critical crack half length $a_c$ is determined. Knowing the tensile stress caused by the second impact and the critical crack half-length the fracture toughness coefficient is calculated from the appropriate fracture mechanics expression.

As a specific example of the method of this invention a specimen of polycarbonate 1½ inches in diameter and one-eighth inch thick was subjected to flat plate impact with a gas gun. The specimen was impacted at 450 feet per second which produced 48 internal penny-shaped cracks ranging in diameter from 0.00055 to 0.218 inch. The transparency of polycarbonate made it a simple matter to count and measure all the cracks in the specimen.

A new specimen was prepared from the old sectioned specimen and impacted at a velocity sufficient to cause about half of the cracks to grow. After impacting at 187 feet per second direct measurement of the cracks in a microscope established that all cracks having an original diameter greater than 0.0389 inch grew, whereas those of diameter smaller than 0.0280 inch were unaffected. In this particular example, rather than have stress gauges on the specimen, the stress level was calculated from the measured impact velocity and the constitutive relation of the material. As known to those skilled in the art, the constitutive relation for any material can be established by performing quasi-static and dynamic compression tests on the material in uniaxial strain, and measuring the stress-volume loading and unloading paths. Such a determination is known to those skilled in the art and will not be discussed in detail herein. In the specific example, the impact velocity of 187 feet per second yielded a tensile stress level of 13.7 ksi.

Thus the critical half crack length $a_c$ for an applied tensile stress of 13.7 ksi was determined to be 0.0167 ± 0.0027 inch. The fracture toughness was determined from Sneddon's expression (given above as equation 1), which yielded a value for fracture toughness $K_{Ic}$ of 2.00 ± 0.80 ksi $\sqrt{\text{in}}$.

When tensile reverberations are sufficiently high to repropagate cracks produced during the initial tension phase, (as shown by the wave propagation diagram in FIG. 2) the $K_{Ic}$ value may be determined from a single impact. This entails calculating the tensile stress in the reverberation phase and being able to correlate crack arrest or stopping positions with markings on the crack surfaces. For example, the stresses in successive tension and compression reverberations in polymers such as the polycarbonate above does not decrease rapidly as is the case for metals. Thus large cracks formed during the initial tension phase after impact are able to repropagate during the second tension phase. Multiple concentric rings on the surfaces of individual cracks of sufficiently large radius thus provide an opportunity to estimate the high strain rate $K_{Ic}$ value from fractographic measurements after the first impact.

The one impact method of determining the fracture toughness coefficient depends upon knowing the stress level in the second tension phase and being able to determine from the fracture surface markings on the specimen the position of the crack front at the onset of successive tensile phases. For the specific example of polycarbonate discussed above, the tensile stress levels in the first and second reverberations were calculated utilizing the constitutive relation for polycarbonate to have been 18.7 ksi and 15.2 ksi, respectively. Inspection of the polycarbonate sample after one impact disclosed that the smallest crack with subsequent growth rings had a diameter of 0.0200 inches, and the largest crack showing no evidence of repropagation had a diameter of 0.0151 inches. Thus the critical half crack length $a_c$ under the first reverberation stress of 18.7 ksi was taken to be 0.0088 ± 0.0012 inches. These values yielded a $K_{Ic}$ of 1.98 ± 0.73 ksi $\sqrt{\text{in}}$. when Sneddon's relation (equation 1) was applied. Thus the agreement with the result of the double impact method is excellent.

As discussed above, when a specimen under investigation is transparent such as the polycarbonate discussed by way of specific example, determination of the true crack size is relatively easy and can be made by direct observation measurement.

Figure 7A:
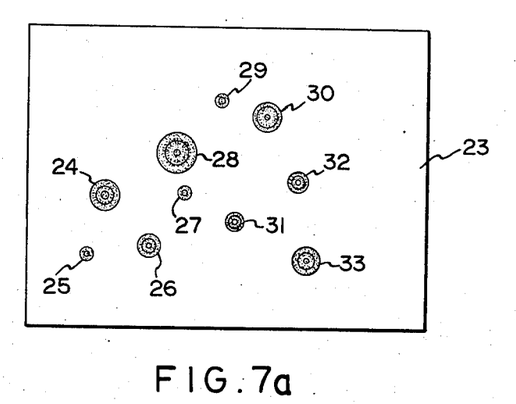
FIGS. 7a and 7b are schematic representations of a microscopic view of a polycarbonate specimen after being imparted to produce internal cracks.
Figure 7B:
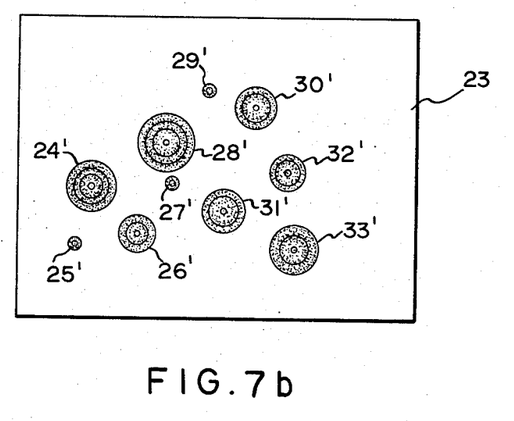

Referring to FIG. 7a, for example, there is schematically illustrated a microscopic view of a portion of a polycarbonate (transparent) sample which has been initially impacted to produce the circular internal cracks shown in FIG. 7. As previously mentioned, the internal cracks in a transparent specimen can be directly observed without the necessity for sectioning the specimen. Thus, after an initial impact the specimen 23 of FIG. 7a is observed to have a plurality of internal cracks 24 through 33 of varying diameters. In accordance with the invention the diameters of the various cracks are recorded. Then the specimen 23 is again impacted. With this subsequent impact some of the cracks will grow or increase in size and some will not. FIG. 7b is a schematic illustration similar to FIG. 7a and showing the same area of the specimen 23 after it has been reimpacted. The various cracks in FIG. 7b are identified by the same reference numeral as used for the same crack in FIG. 7a, but with a prime added thereto. Further, in accordance with the invention, the diameters of the cracks 24' through 33' of the cracks in FIG. 7b are measured and recorded. Upon a comparison of the diameters of the cracks 24' through 33 ' it is observed that some of the smaller diameter cracks did not grow whereas others of the larger cracks did grow. Thus cracks 25, 27 and 29 did not grow, whereas cracks 24, 26, 28, 30, 31, 32 and 33 did grow. Utilizing this technique, the critical crack diameter, above which cracks grew and below which they did not, is determined. Utilizing this critical size and the known rate of loading for the second impact, the value of $K_{IC}$ for the material is determined.

On the other hand, when the specimen is opaque rather than transparent, determination of crack size is done on a statistical basis. The specimen is impacted to produce a distribution of internal cracks. The thus impacted specimen is sectioned and polished to expose a portion of the internal cracks. The crack size and orientation distribution is recorded. The specimen is then re-impacted and sectioned and polished again to expose a portion of the cracks internal to the re-impacted specimen. A new statistical crack size distribution is determined. Comparison of the initial statistical distribution of crack sizes with the subsequent statistical distribution of crack sizes provides a value for the critical crack size.

When, however, the material under investigation is opaque what is observed from micro-photographs of polished sections of the specimen is a crack characterized by the trace length of its intersection with the polished surface. What is required in these instances is, therefore, a technique for deriving the true crack size from the trace length. One way in which to do this is through the use of a Scheil-type statistical transformation. A discussion of one such suitable technique follows.

Experimental knowledge of the crack distribution is derived from microphotographs of polished sections of the impacted specimens. A crack is characterized by the trace length, 2c, of its intersection with the polished surface (the polished surface is parallel to the shock propagation direction z), the trace width, w, and the angle of inclination, $\alpha$, to the intersection of the shock front with the surface. Thus an areal crack density function $n(c,w,\alpha,z)$ of cracks of $c,w,\alpha$, and position z can be experimentally determined from the microphotograph. The implicit assumption here of one-dimensional symmetry is justifiable if the central portions of the specimen are used to determine the density function, if only the first few reverberations of the shock wave have a significant effect upon the crack distribution, and if these reverberations are planar. To satisfy these requirements, only the central third of the specimen was used for analysis.

Figure 3:
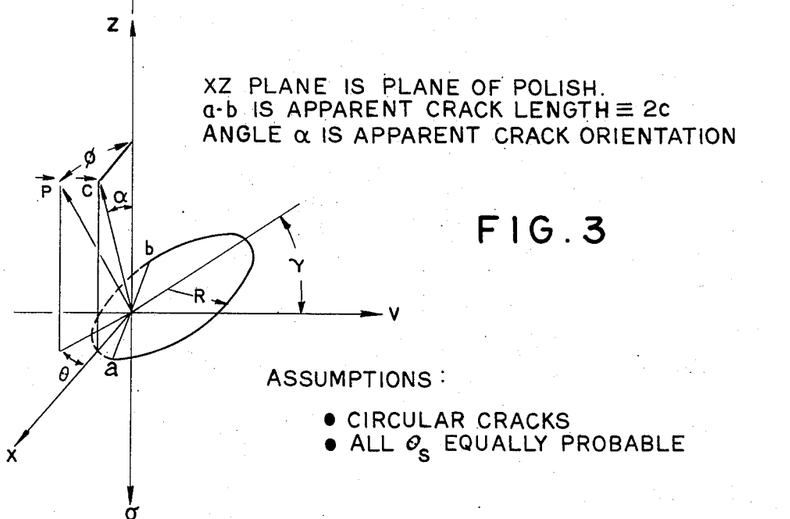
FIG. 3 is a diagram in the XYZ plane for defining some variables used in transforming quantities for a surface distribution of cracks in a specimen to a volume distribution.

The problem discussed here is that of determining the volume density of cracks from the observed areal density $n(c,w,\alpha)$. If it is assumed that an individual crack is penny-shaped, it can be described by its size, shape and orientation. A convenient way to describe the orientation of the crack plane is by the angle of inclination $\psi$ of the crack normal to the tensile axis (or shock direction) and the angle of rotation $\theta$ of the normal about the tensile axis. The angular relationships of $\theta, \psi$, and $\alpha$ are shown in FIG. 3 where the angle $\gamma$ is also defined. In the special case of spherical voids only the radius c is important. The present statistical analysis for brittle cracks will contain the spherical void mode of fracture as a special case.

Observations in accordance with a specific embodiment of the invention are made on only one polish plane in the specimens so that only the experimental variables $c,w$, and $\alpha$ are available. For this analysis, it is desirable to make assumptions on crack shape and orientation to reduce to two the number of parameters needed to describe the volume distribution. A number of ways to do this are possible.

The assumptions of the analysis described below are: (1) cracks are circular and specified by crack radius R, (2) the crack distribution is axisymmetric with respect to $\psi$, and (3) the finite crack width $w$ can be ignored in the statistical analysis. Assumption (1) is not as unrealistic as it might first appear because of the qualitative observations that most cracks have small inclination angles $\alpha$, and the stresses are high enough that the crack growth velocities are probably near the limiting value in most directions. Assumption (2) is plausible for polycrystalline materials without texture. Assumption (3) is satisfied if the crack width is a function of the crack radius for given stress conditions, as is the case for ideal penny-shaped cracks. Thus the problem is to compute the volume density of cracks $\rho(R,\psi)$ of radius R and inclination $\psi$ from a knowledge of the areal density $n(c,\alpha)$ of cracks with intersection trace lengths, 2c, and apparent inclination $\alpha$.

First it is necessary to relate $N(R\psi, \theta)$, the number of cracks will be specified $R,\psi$, and $\theta$, which intersect the plane of polish, to the volume density $\rho(R,\psi)$. Then the observed areal density $n(c,\alpha)$, which is a function of apparent length c and apparent inclination $\alpha$, is related to $n(R,\psi,\theta)$. These relations lead to an equation between areal density $n(c,\alpha)$ and volume density $(R,\psi)$. This equation provides the required transformation.

The surface density of cracks $n(R,\psi,\theta)$ is related to the volume density $\rho(R,\psi)$ in two steps. If the crack is to be cut by the plane of polish, that plane must fall within the length $2R \cos \gamma$, the length of the crack normal to the plane of polish as shown in FIG. 3. The number of cracks with centers in that volume is $2R\rho(R,\psi,\theta) \cos \gamma$ per unit area, where $\rho(R,\psi,\theta)$ is the volume density, which is not necessarily axisymmetric (independent of $\theta$). Therefore $$n(R,\psi,\theta) = 2R\rho(R,\psi,\theta) \cos \gamma \qquad (2)$$

If all angles $\theta$ are taken as equally probable, then $$\rho(R,\psi,\theta) = \rho(R,\psi)P(\theta) = 1/2\pi \, \rho(R,\psi) \qquad (3)$$

where $P(\theta)$ is the probability of finding a crack of angle $\theta$. Therefore $$n(R,\psi,\theta) = R/\pi\, \rho(R,\psi) \cos \gamma \quad (4)$$

From FIG. 3 the following relations can be derived:

$$\tan \alpha = \cos \theta \tan \psi$$
$$\tan \gamma = \sin \theta \tan \psi \quad (5)$$

Since $\psi$ and $\alpha$ are sufficient to specify the crack orientation as long as the orientation of the polish plane is fixed, $n(R,\psi,\alpha)$ can be transformed to $n(R,\psi,\alpha)$ through the use of the following equations:

$$n(R,\psi,\theta)[(\partial\theta/\partial\alpha)_\psi] \quad (6)$$

$$\cos \gamma = [1 + \cos^2\alpha - \cos^2\psi/\cos^2\alpha \cos^2\psi]^{-1/2} \quad (7)$$

The expression for $\cos \gamma$ can be derived from equation (5). Combining these results with equation (4) leads to $$n(R,\psi,\theta) = \frac{R\rho(R,\psi)}{\pi\left\{1+\dfrac{\cos^2 \alpha - \cos^2 \psi}{\cos^2 \alpha \cos^2 \psi}\right\}^{1/2}} \left|\left(\frac{\partial\theta}{\partial\alpha}\right)_\psi\right| \quad (8)$$

From the first of equation (5) the Jacobian of the transformation can be computed.

$$(\partial\theta/\partial\alpha) = -\cos \psi/\cos \alpha \{\cos^2\alpha - \cos^2\psi\}^{1/2} \quad (9)$$

and $n(c,\alpha)$ can be related to $n(r,\psi,\alpha)$ $$n(c,\alpha) = \int_c^\infty \int_\alpha^{\pi/2} P(c|R\psi\alpha) n(R,\psi,\alpha) dR\, d\psi \quad (10)$$

where $P(c|R\psi\alpha)$ is the probability that if a crack of $R,\psi,$ and $\alpha$ is intersected, the trace will be of length $2c$. Now the probability is derived.

Suppose $r$ is the radial distance of the crack trace from the crack center. Since the probability of intersection at $r \pm \delta r/2$ is proportional only to $\delta r$, it is easy to derive $$P(c|R,\psi,\alpha) = c/R\sqrt{R^2-c^2} \quad (11)$$

Thus from equations (8), (9), (10), and (11) the desired transformation equation is obtained:

$$n(c,\alpha) = \frac{c}{\pi \cos \alpha} \int_c^\infty \int_\alpha^{\pi/2} \frac{\cos \psi\, \rho(R,\psi) dR\, d\psi}{\left\{\left(1+\dfrac{\cos^2 \alpha - \cos^2 \psi}{\cos^2 \alpha \cos^2 \psi}\right)(\cos^2 \alpha - \cos^2 \psi)(R^2-c^2)\right\}^{1/2}} \quad (12)$$

Equation (12) is an integral equation for $\rho(R,\psi)$, and a method for its solution follows.

The objective is to determine the volume distribution $\rho(R,\psi)$ from the surface distribution $n(c,\alpha)$ by solution of the integral equation, equation (12). The procedure used is a generalization to two dimensions of a matrix inversion method for computing the volume density of spherical particles.

To simplify notation in equation (12), define for $R \geq c$ and $\psi \geq \alpha$ $$G(\alpha, c, R, \psi)$$
$$= \frac{\dfrac{c \cos \psi}{\pi \cos \alpha}}{\left\{\left(1+\dfrac{\cos^2 \alpha - \cos^2 \psi}{\cos^2 \alpha \cos^2 \psi}\right)(\cos^2 \alpha - \cos^2 \psi)(R^2-c^2)\right\}^{1/2}}$$
$$= \frac{c \sec^2 \alpha}{\pi\{(1+\tan^2 \psi - \tan^2 \alpha)(\tan^2 \psi - \tan^2 \alpha)(R^2-c^2)\}^{1/2}} \quad (13)$$

Define $G(R,\psi,c,\alpha) \equiv 0$ for $R < \alpha$. Then the integral equation to be solved is $$n(c,\alpha) = \int_c^\infty \int_\alpha^{\pi/2} G(R,\psi,c,\alpha) \rho(R,\psi) dR\, d\psi \quad (14)$$

The solution is carried out by discretizing the functions $n$ and $\rho$ into matrices. These matrices are $N_{ij}$ and $\rho_{rs}$, defined as follows $$N_{ij} \equiv \int_{\alpha_i}^{\alpha_{i+1}} d\alpha \int_{c_j}^{c_{j+1}} dc\, n(c,\alpha) \quad (15)$$

$$\rho_{rs} \equiv \int_{\alpha_r}^{\alpha_{r+1}} d\alpha \int_{c_s}^{c_{s+1}} dR\, \rho(R,\psi) \quad (16)$$

that is, $\rho_{rs}$ is the number of cracks per unit volume with orientation $\psi$ between $\alpha_r$ and $\alpha_{R+1}$ and radius $R$ between $c_s$ and $c_{s+1}$. The limits are expressed in terms of $\alpha_r$ and $c_s$ to emphasize that the same intervals are chosen for $\psi$ and $\alpha$, and for $c$ and $R$. These matrices $N_{ij}$ and $\rho_{rs}$ are related through a tensor equation analogous to equation (14).

$$N_{ij} = \sum_{rs} a_{ijrs} \rho_{rs} \quad (17)$$

The elements of the tensor $a_{ijrs}$ are found as follows. Replace $n(c,\alpha)$ in equation (15) by its value in equation (14) to obtain $$N_{ij} = \int_{\alpha_i}^{\alpha_{i+1}} d\alpha \int_{c_j}^{c_{j+1}} dc \int_c^\infty dR \int_\alpha^{\pi/2} d\psi\, G(R,\psi,c,\alpha) \rho(R,\psi) \quad (18)$$

Now change the order of integration, discard terms that go to zero, and obtain $$N_{ij} = \int_{\alpha_i}^{\alpha_{i+1}} d\psi \int_{c_j}^{c_{j+1}} dR \int_{\alpha_i}^{\alpha} d\alpha \int_{e_j}^{R} dc\, G(R,\psi,c,\alpha)\rho(R,\psi)$$

$$+ \int_{\alpha_{i+1}}^{\pi/2} d\psi \int_{c_j}^{c_{j+1}} dR \int_{\alpha_i}^{\alpha_{i+1}} d\alpha \int_{c_j}^{R} dc\, G(R,\psi,c,\alpha)\rho(R,\psi)$$

$$+ \int_{\alpha_i}^{\alpha_{i+1}} d\psi \int_{c_{j+1}}^{\infty} dR \int_{\alpha_i}^{\psi} d\alpha \int_{c_j}^{c_{j+1}} dc\, G(R,\psi,c,\alpha)\rho(R,\psi)$$

$$+ \int_{\alpha_{i+1}}^{\pi/2} d\psi \int_{c_{j+1}}^{\infty} dR \int_{\alpha_i}^{\alpha_{i+1}} d\alpha \int_{c_j}^{c_{j+1}} dc\, G(R,\psi,e,\alpha)\rho(R,\psi) \quad (19)$$

The next step is to perform the two outer integrals over the same discrete intervals used to define $\rho_{rs}$. Then, by comparing equations (16), (17), and (19), the elements of $a_{ijrs}$ are ratios of this type $$a_{ijrs} = \frac{\int_{\alpha_r}^{\alpha_{r+1}} d\psi \int_{c_s}^{c_{s+1}} dR \int_{\alpha_i}^{\alpha_{i+1}} d\alpha \int_{c_j}^{c_{j+1}} dc\, G(R,\psi,c,\alpha)\rho(R,\psi)}{\int_{\alpha_r}^{\alpha_{r+1}} d\psi \int_{c_s}^{c_{s+1}} dR\, \rho(R,\psi)} \quad (20)$$

where $r > i$ and $s > j$. For terms in which $i = r$, the upper limit for the integral over $\alpha$ must be replaced by $\psi$. Similarly, for terms in which $j = s$, the upper limit in the integral over c must be replaced by R. Formally, the problem is solved by evaluating Eq. (19) for the matrix elements, computing the inverse matrix $a_{ijrs}^{-1}$, and writing the solution as $$\rho_{ij} = \sum_{rs} a_{ijrs}^{-1} N_{rs} \quad (21)$$

The $a_{ijrs}$ can be easily evaluated if the intervals $\delta\alpha$ and $\delta c$ are chosen small enough that over each interval $\rho(R,\psi)$ can be considered to be constant. In this case $\rho(R,\psi)$ can be cancelled out of the terms in Eq. (20), and what remains are integrals such as $$a_{ijrs} = \frac{1}{\delta\alpha_r \delta c_s} \int_{\alpha_r}^{\alpha_{r+1}} d\psi \int_{c_s}^{c_{s+1}} dR \int_{\alpha_i}^{\alpha_{i+1}} d\alpha \int_{c_j}^{c_{j+1}}$$

$$\frac{c\,\sec^2\alpha\, dc}{\pi\{(1+\tan^2\psi-\tan^2\alpha)(\tan^2\psi-\tan^2\alpha)(R^2-c^2)\}^{1/2}}$$

(22)

which are independent of the form of the distribution. This integral can be separated into two independent parts, one containing length variables and one with angle variables, as follows:

$$a_{ijrs} = F_{js}\, G_{ir}/2\pi\delta\alpha_r \delta c_s \quad (23)$$

where $$F_{js} = \int_{c_s}^{c_{s+1}} dr \int_{c_j}^{c_{j+1}} \frac{2dc}{\sqrt{R^2-c^2}} \quad (24)$$

and $$G_{ir} = \int_{\alpha_r}^{\alpha_{r+1}} d\psi \int_{\alpha_i}^{\alpha_{i+1}} \frac{\sec^2\alpha\, d\alpha}{[(1+\tan^2\psi-\tan^2\alpha)(\tan^2\psi-\tan^2\alpha)]^{1/2}}$$

(25)

Equations (24) and (25) are written for the cases $s > j$ and $r > i$. For $s = j$ and $r = i$, the upper limit of the inner integrals are R and $\psi$, respectively. F and G are zero for $s < j$ and $r < i$. The value of F can be obtained analytically. For $s > j$ $$F_{js} = c_{s+1}\sqrt{c_{s+1}^2 - c_j^2} - c_s\sqrt{c_s^2 - c_j^2}$$
$$- c_{s+1}\sqrt{c_{s+1}^2 - c_{j+1}^2} + c_s\sqrt{c_s^2 - c_{j+1}^2}$$
$$- c_j^2 \log\left|\frac{c_{s+1}+\sqrt{c_{s+1}^2-c_j^2}}{c_s+\sqrt{c_s^2-c_j^2}}\right| + c_{j+1}^2 \log\left|\frac{c_{s+1}+\sqrt{c_{s+1}^2-c_{j+1}^2}}{c_s+\sqrt{c_s^2-c_{j+1}^2}}\right|$$

(26)

For $s = j$ $$F_{jj} = c_{j+1}\sqrt{c_{j+1}^2-c_j^2} - c_j^2 \log\left|\frac{c_{j+1}+\sqrt{c_{j+1}^2-c_j^2}}{c_j}\right| \quad (27)$$

To integrate Eq. (25) it is convenient to replace $\alpha$ by the variable $$u = \sin^{-1}(\tan\alpha)/(\tan\psi) \quad (28)$$

With this transformation Eq. (25) becomes $$G_{ir} = \int_{\alpha_r}^{\alpha_{r+1}} d\psi \int_{\alpha_i}^{\alpha_{i+1}} \frac{du}{[1+\cos^2 u \tan^2\psi]^{1/2}} \quad (29)$$

When the order of integration is reversed, the inner integral can be evaluated analytically.

$$G_{ir} = \int_{\arcsin(\tan\alpha_i/\tan\alpha_{r+1})}^{\arcsin(\tan\alpha_{i+1}/\tan\alpha_{r+1})} \frac{du}{\sin u} \int_{\psi=\alpha_r}^{\psi=\alpha_{r+1}} d[\arcsin(\sin u \sin\psi)]$$

(30)

Figure 4:
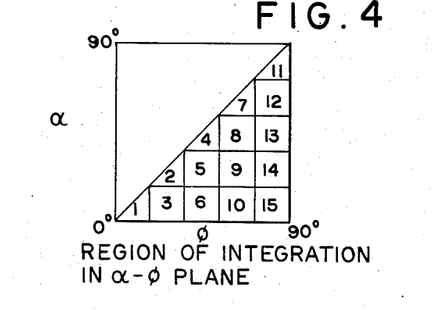
FIGS. 4 through 6 are diagrams of integration regions used in the transformation of crack surface distributions to crack volume distributions.
Figure 5:
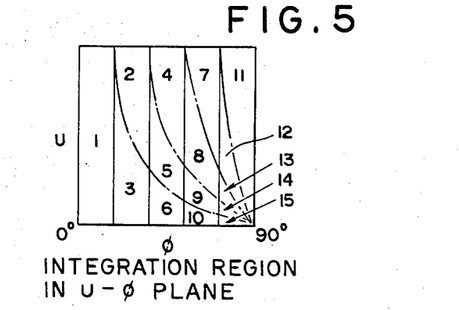
Figure 6:
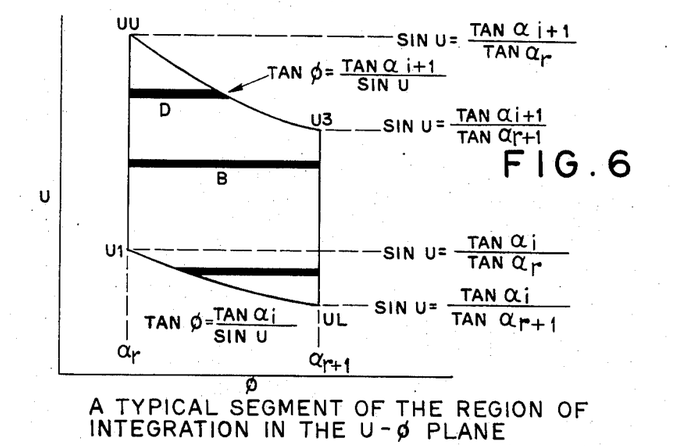

The limits of integration and the meaning of the reversal of order of integration may be visualized with the aid of Figure illustrations. In FIG. 4 the region of integration in the $\alpha$–$\psi$ plane is shown. Each numbered triangle or square represents a region of integration for one element of the $G_{ir}$ matrix. The transformed areas are shown in FIG. 5 in the $u$–$\psi$ plane. A typical numbered element is shown in FIG. 6 with its $u$–$\psi$ coordinates labeled. The inner integral in Eq. (27) is evaluated over a strip such as B; then the outer integral is evaluated by adding together values from all strips. It is apparent from FIGS. 5 and 6 that the simple limits given in Eq. (30) for the inner integral must be modified for strips such as A and D. The combination of numerical and analytical integration required to obtain $G_{ir}$ can be written into a computer program.

Following computation of $F_{js}$ and $G_{ir}$, $a_{ijrs}$ is obtained from Eq. (23), and Eq. (21) is used to obtain $\rho(R,\psi)$. These computations can also be written into a computer program to obtain the true volume distribution of cracks in a specimen from the surface distribution.

Thus the mathematical transformation from damage surface distributions to the corresponding volume distributions is discussed in detail above. A typical result is shown in FIG. 8, which shows the computed volume distribution for microcracks of all orientations in Armco iron.

Figure 8:
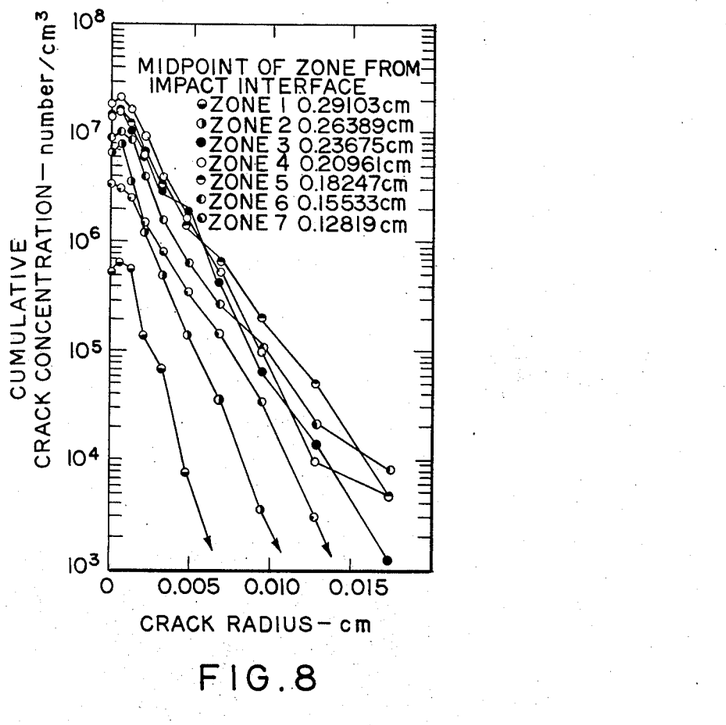
FIG. 8 is a plot of cumulative crack concentration or cumulative number of cracks versus crack radius for different loading zones of an impacted specimen of iron.

In FIG. 8 the cumulative number of cracks $N_g$ (the number of cracks with radii greater than or equal to a given radius) in accordance with the following equation $$N_R = \int_R^\infty \int_0^{\pi/2} \rho(R,\psi) d\psi dR \qquad (31)$$

is plotted against crack radius. Similar plots are obtained for crack number versus crack orientation.

Such plots are obtained for each zone in the target specimen, that is, for several stress durations. Thus, for a particular target, families of curves are obtained as shown in FIG. 8, where each curve refers to a different stress duration.

In accordance with the method of the invention for determining $K_{Ic}$, re-impacted specimens show changes in the curves of FIG. 8 because cracks above the critical size will have grown whereas those below the critical size will have remained stationary. Of course, the smallest cracks that grow will be those with the most favorable orientation, namely, those for which the plane of the crack is normal to the direction of wave propagation.

Figure 9:
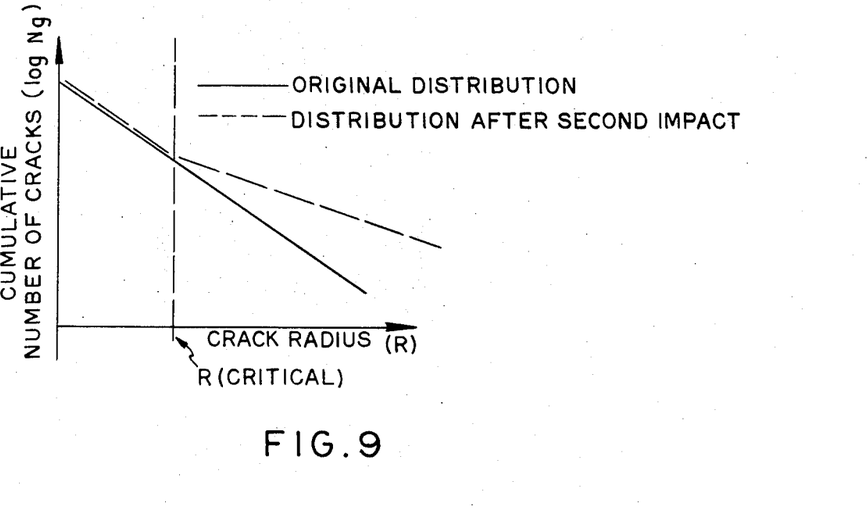
FIG. 9 is a plot of crack concentration or cumulative number of cracks versus crack radius for a particular loading zone of a specimen showing both initial crack distribution and crack distribution after reimpacting the specimen.

Referring to FIG. 9, for example, there is shown a plot of the log of the cumulative number of cracks $N_g$ versus crack radius for one stress zone of a specimen. The solid line corresponds to the statistical crack distribution after an initial impact and the dashed line corresponds to the statistical crack distribution of the specimen after it has been reimpacted. As can be seen from FIG. 9, a "kink" occurs in the dashed line at some particular crack radius. This is the critical radius; that is, the cracks having a radius below this critical radius did not grow with the second impact, whereas cracks having a radius above this critical radius did grow. Thus, in accordance with this aspect of the invention, by utilizing a statistical technique the critical crack size is determined. Knowing the critical crack size and the loading history of the specimen the value of $K_{Ic}$ can be determined.

Thus what has been described is a method for determining the plane strain fracture toughness coefficient of a material using small dynamically loaded specimens of the material. The method is based upon comparison in a statistical manner of the crack size distribution in the specimen to a previously known crack size distribution. For transparent materials crack size distribution can be determined by direct inspection and measurement of the specimen. For opaque materials a transformation is performed to transform surface crack distributions to volume crack distributions. One statistical method for such transformation has been disclosed. Although the invention has been shown and discussed in connection with a particular embodiment it will be obvious to those skilled in the art that various modifications may be made to the specific embodiment disclosed herein without departing from the true spirit and scope of the invention.

What is claimed is:

1. A method for determining the plane strain fracture toughness $K_{Ic}$ of a material by determining the critical crack half length $a_c$ comprising the steps of loading a specimen of the material to produce uniaxial strain which causes internal cracks in the specimen, determining the size distribution of the internal cracks in the specimen, loading the specimen again, determining the new internal crack size distribution and comparing the new crack size distribution with the former crack size distribution whereby the critical crack half length $a_c$ above which cracks grew and below which they did not is determined.

2. A method for determining the plane strain fracture toughness $K_{Ic}$ of a material by determining the critical crack half length $a_c$ comprising the steps of loading a first specimen of the material to produce uniaxial strain which causes internal cracks in the specimen, determining the size distribution of the internal cracks in the specimen, preparing a second specimen from a portion of the first specimen, loading the second specimen, determining the new internal crack size distribution and comparing the new crack size distribution with the former crack size distribution whereby the critical crack half length $a_c$ above which cracks grew and below which they did not is determined.

3. A method in accordance with claim 2 wherein the specimens have a high aspect ratio and in which the loading is accomplished through flat-plate impacting.

4. A method in accordance with claim 2 including the step of sectioning the specimens after each impact to expose the internal cracks.

5. A method in accordance with claim 2 including the step of determining the stress $\sigma$ to which the second specimen is subjected during loading so that the fracture toughness $K_{Ic}$ can be computed.

6. A method in accordance with claim 4 wherein the steps of determining the size distribution of internal cracks in the first and second specimens comprise determining the surface distribution of internal cracks and determining from the surface distribution the volume distribution of internal cracks.

7. A method for determining the plane strain fracture toughness $K_{Ic}$ of a material by determining the critical crack half length $a_c$ comprising the steps of loading a specimen of the material to produce uniaxial strain, said loading producing an initial tension phase in the specimen causing internal cracks to be propagated, said loading also producing a subsequent tensile reverberation which repropagates cracks produced during the initial tension phase, determining the size of the smallest crack propagated during the second tension phase, determining the size of the largest crack not propagated during the second tension phrase whereby the critical crack half length $a_c$ above which cracks grew and below which they did not is determined.

8. A method in accordance with claim 7 wherein the loading of the specimen is accomplished by flat-plate impacting.

9. A method in accordance with claim 7 including the step of determining the stress in the specimen during the tensile reverberation.

* * * * *